C. H. GEORGER.
VEHICLE SIGNAL.
APPLICATION FILED APR. 21, 1921.
1,410,670.
Patented Mar. 28, 1922.
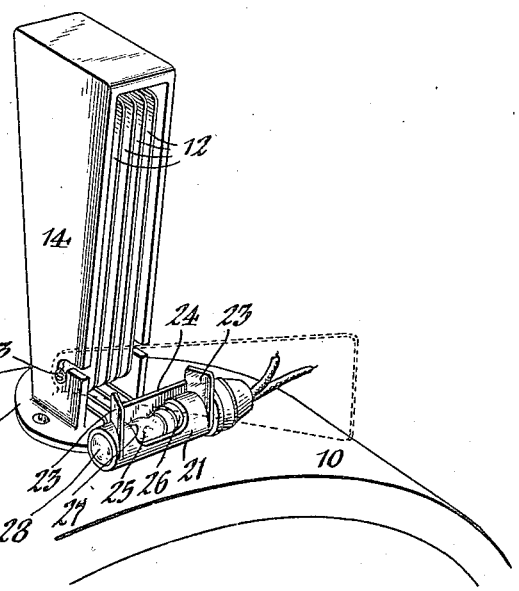
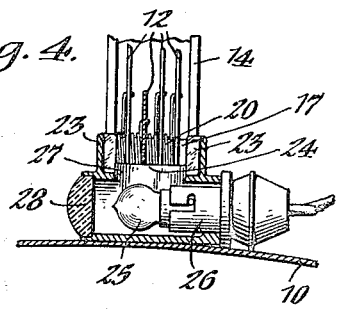
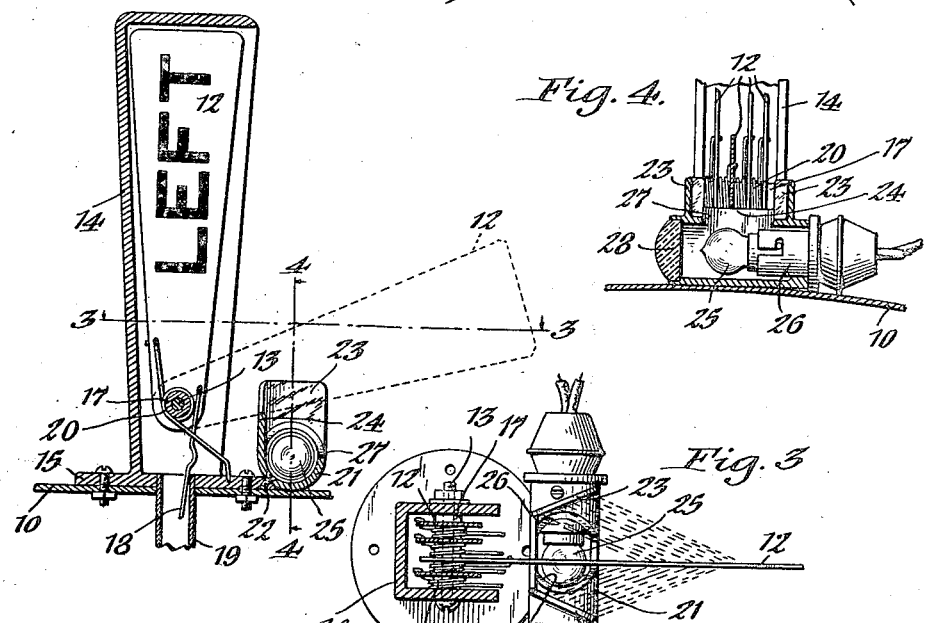
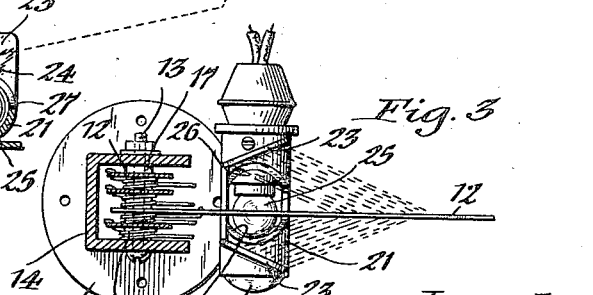
Inventor,
Clifford H. George
by Myer Popf
Attorneys.

UNITED STATES PATENT OFFICE.

CLIFFORD H. GEORGER, OF BUFFALO, NEW YORK.

VEHICLE SIGNAL.

1,410,670.  Specification of Letters Patent.  Patented Mar. 28, 1922.

Application filed April 21, 1921. Serial No. 463,119.

*To all whom it may concern:*

Be it known that I, CLIFFORD H. GEORGER, a citizen of the United States, residing at Buffalo, in the county of Erie and State of New York, have invented new and useful Improvements in Vehicle Signals, of which the following is a specification.

This invention relates to a visual vehicle signal, and has for its chief object the provision of a signal of this character which is conspicuous and plainly visible both day and night to the drivers of other cars as well as traffic officers and pedestrians.

Another object is to provide improved means for illuminating the front and rear sides of the signal or indicating arms, or plates.

In the accompanying drawings: Figure 1 is a perspective view of the signal applied to the fender of an automobile, one of the indicating arms being shown by dotted lines in its operative position. Figure 2 is an enlarged vertical transverse section thereof. Figure 3 is a horizontal section on line 3—3, Fig. 2. Figure 4 is a vertical longitudinal section on line 4—4, Fig. 2.

Similar characters of reference indicate corresponding parts throughout the several views.

This improved signal is shown mounted on the front fender or mud guard 10 of an automobile, although it may be located on any other part thereof where the same is conspicuous and readily seen from either the front or rear end of the automobile.

The signal preferably includes one or more vertically-swinging indicating arms or semaphores 12 pivotally mounted at their lower ends on a horizontal pivot bolt 13 arranged in the lower portion of a suitable casing or housing 14 having a base 15 suitably secured to the fender 10 of the automobile. This casing is closed at its back, sides and top, and open at its front side, the casing being of the proper dimensions to completely conceal the indicating arms when in their inoperative position. In the drawings, four indicating arms are shown, bearing on both sides thereof suitable direction characters such as "Left," "Right," "Stop" and "Straight." They are arranged in spaced relation to each other and separated by suitable spacing collars or sleeves 17 mounted on the pivot bolt.

Any suitable means may be employed for selectively actuating the indicating arms to move them into and out of their casing. As shown in the drawings, to each of the indicating arms is connected one end of a rigid actuating member 18 which passes through a guide tube 19 leading to the dash board of the automobile from which place they may be operated. To retain said indicating arms in their inoperative position within the casing 14, coil springs 20 are provided which surround the spacing collars 17, one leg of each spring being connected to the corresponding indicating arm, while its other leg is suitably secured to the base of said casing, as shown in Fig. 2.

The means for illuminating both sides of the indicating arms while in their operative position are preferably constructed as follows:

21 represents an auxiliary casing or lamp body of tubular form arranged adjacent the base 15 of the signal casing and suitably secured thereto by screws 22 or other appropriate means. Arranged at each end of this auxiliary casing and extending upwardly therefrom is a light reflecting member or wing 23 which is highly polished on its inner or reflecting face. These reflecting members are disposed transversely of their casing and diverge outwardly in a horizontal plane, as shown in Figs. 1 and 3. An upright stop flange 24 is disposed at the rear upper side of said auxiliary casing and extends lengthwise thereof between the corresponding ends of said reflecting members, said flange not only serving to limit the downward movement of the indicating arms 12, but also as a reflector for projecting the rays of light outwardly along the sides of the indicating arms. As shown in Fig. 2, this stop flange terminates a suitable distance below the upper edges of the reflecting members, thereby allowing the lower portions of the signal arms to lie between said reflecting members and assume a substantially inclined position, slightly above the horizontal, when moved to their operative position.

Arranged substantially centrally within the tubular casing 21 is an electric lamp 25 carried by a socket 26 suitably secured to said casing and connected to a source of electricity. The upper side of said tubular casing is provided with a light-emitting opening 27, whereby the light is directed upwardly against the members 23 and thence reflected outwardly and upwardly along the opposite sides of the projected indicating arm, thereby illuminating the latter and clearly indicating to those in front and in rear of the vehicle the intentions of the driver as to the particular direction he proposes to drive the vehicle.

The lamp 25 remains lighted constantly except during the day, and is always ready to illuminate the respective indicating arms when they are moved into operative position.

The tubular casing 21 may be provided in its front end with a suitable closure, a colored lens 28 being shown in the drawings for this purpose.

I claim as my invention:

1. In a signal of the character described, a vertically swinging indicating arm adapted to be raised into an upright inoperative position and lowered into a substantially horizontal operative position, a lamp casing provided with an opening in its upper side over which said indicating arm is arranged in its operative position, and a lamp in said casing below said opening, the inner wall of said casing serving as a reflector for projecting the rays of light from said lamp outwardly relatively to the indicating arm and also serving as a stop to limit the downward movement of said arm.

2. In a signal of the character described, a vertically-swinging indicating arm adapted to be raised into an upright inoperative position and lowered into a substantially horizontal operative position, a lamp casing provided with an opening in its upper side over which said indicating arm is arranged in its operative position, a lamp in said casing below said opening, the inner wall of said casing serving as a reflector for projecting the rays of light from said lamp outwardly relatively to the indicating arm and also serving as a stop to limit the downward movement of said arm, and reflectors arranged at opposite ends of the opening in said lamp casing for directing the light into the path of the operative position of said indicating arm.

3. In a signal of the character described, a vertically-swinging indicating arm adapted to be raised into an upright inoperative position and lowered into a substantially horizontal operative position, a lamp casing provided with an opening in its upper side, a lamp in said casing below said opening, and reflectors arranged at opposite ends of said opening, the inner wall of said casing between said reflectors extending above said opening and serving as a stop to limit the downward movement of said indicating arm.

4. In a signal of the character described, a vertically-swinging indicating arm adapted to be raised into an upright inoperative position and lowered into a substantially horizontal operative position, a lamp casing provided with an opening in its upper side, a lamp in said casing below said opening, and outwardly diverging reflecting members arranged transversely of said lamp casing at opposite ends of its opening, the inner wall of said casing between said reflecting members extending above said opening and terminating below the upper ends of the reflecting members, said inner wall serving as a stop to limit the downward movement of said indicating arm.

CLIFFORD H. GEORGER.